O. TSCHANZ.
DRIVING MECHANISM FOR RAILWAY VEHICLES WITH ELECTRIC MOTORS RIGIDLY MOUNTED ON SPRING SUPPORTED FRAMES.
APPLICATION FILED NOV. 25, 1916.
1,311,928.
Patented Aug. 5, 1919.
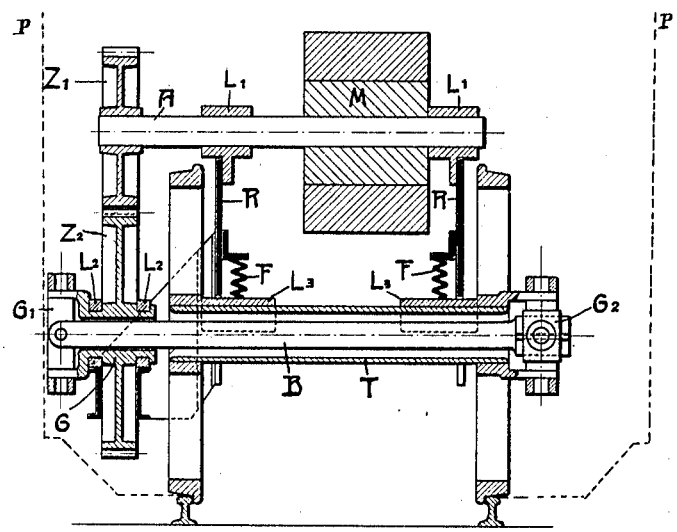
Inventor:
Otto Tschanz
by [signature]
atty.

UNITED STATES PATENT OFFICE.

OTTO TSCHANZ, OF BERNE, SWITZERLAND.

DRIVING MECHANISM FOR RAILWAY-VEHICLES WITH ELECTRIC MOTORS RIGIDLY MOUNTED ON SPRING-SUPPORTED FRAMES.

1,311,928. Specification of Letters Patent. Patented Aug. 5, 1919.

Application filed November 25, 1916. Serial No. 133,333.

*To all whom it may concern:*

Be it known that I, OTTO TSCHANZ, a citizen of the Swiss Confederation, and residing at Berne, Switzerland, have invented certain new and useful Improvements in Driving Mechanism for Railway-Vehicles with Electric Motors Rigidly Mounted on Spring-Supported Frames, of which the following is a specification.

This invention relates to railroad cars and locomotives and more particularly to those which are electrically driven and in which the electric motor is rigidly fixed on a spring supported frame. One of the main requirements in connection with such cars or locomotives is to reduce the mass and hence the dead weight of the parts which are fixedly connected with the driving axles. Several methods of construction have already been proposed in which all the transmission elements between the motor and the driving axle or axles are likewise carried by or connected with the spring-supported frame. The coupling member between the driving elements and the driving axle or axles in that case must be capable of not only imparting the entire torque of the motor to the driving axle or axles but also be capable of taking up the entire play of the bearing springs. It is the play of the bearing springs which places a very considerable additional strain on the coupling member, and this additional strain is still further increased, if the driving axle or axles are radially adjustable in the frame, or if the driving axle or axles are carried in a separate truck, while the electric motor and the transmission elements are carried by the main frame.

My invention has for its object to reduce to a minimum the said additional strain on the coupling member. To this end, I use as a coupling member between the driving axle and the last driving element which is fixed to the main frame and is placed outside the driving wheels, two universal joints connected by a shaft which is free to move longitudinally. Now, it is well known that the efficiency of a universal joint is greater as the angle of the driven shaft with the driver is smaller. In order to maintain as small an angle as possible the shaft connecting the said two universal joints is made as long as possible. The length of this connecting shaft is limited by the overall dimensions within which the car or locomotive has to be built; it also depends upon whether the universal joint which is fixed to the axle is placed at the end of this axle nearest to the driving element or at the opposite end. In both cases the greatest possible length will be obtained by placing the universal joint which is fixed to the driving element at as great a horizontal distance from the center line of the car or locomotive as the overall dimensions will allow.

In order to fulfil these conditions, the connection between the latter universal joint and that fixed to the driving axle can, however, only be effected by means of a connecting shaft passing through the center of the said driving element, which is made hollow for the purpose. If the said connecting shaft passes also through the driving axle, which is also made hollow for the purpose, and the universal joints are fixed at the extreme ends of the said connecting shaft, the greatest possible length of the latter will have been reached. This arrangement has the additional advantage of giving easy access to the two universal joints.

The employment, as a coupling member, of two universal joints, as described, also permits a certain play of the driving element relative to the driving axle in a longitudinal direction, so that the latter is not only free to move laterally, but can also be radially adjustable, without any additional strain being put thereby on the coupling member. The advantage of radial adjustability of a driving axle is, that a frame can be supported on a large number of driving axles, without subjecting the wheel flanges to great wear, so that locomotives can be built with a rigid frame, for work which, otherwise, could only be done by articulated locomotives, the weight on the axles being the same in both cases.

Examples of my invention as applied to a locomotive are illustrated in the accompanying drawing, which shows a vertical cross section and the extreme limit beyond which no part of the locomotive must go, said limits being indicated in dotted lines P.

The locomotive frame R is supported by the bearings $L^3$ on the driving axle T, springs F (conventionally illustrated) being interposed between the frame and the said bearings. The shaft A of the electric motor M is carried in the bearings $L^1$ which are rigidly connected with the frame R. On the shaft A is mounted a driving pinion Z¹ which is in mesh with the driving gear wheel Z². The hub G, of the latter is formed so as to be carried in two bearings L², which are also rigidly connected by a suitable bracket or otherwise with the frame R. On the outer side, the hub G is provided with a universal joint G¹, connected by a shaft B extending freely through the said hub G to a second universal joint G², the latter being connected to the driving axle T, on which are mounted the two driving wheels. To make the shaft B as long as possible the universal joint G² may be placed at the extreme end of the driving axle, the latter being hollow and the shaft B extending freely therethrough as shown in Fig. 1. As the other is placed on the outside of the driving gear-wheel, they are as far apart as possible, so that when the hollow boss of the gear wheel Z² moves vertically relative to the hollow driving axle T due to the action of the spring or other cause, the angular displacement of the coupling shaft B with regard to the driving axle T is reduced to a minimum.

In order to permit of a radial adjustment of the driving axle T relative to the fixed frame R, the hollow axle T and the shaft B may have longitudinal play relative to each other, which is provided for in the universal joint G², in which the shaft B is keyed or otherwise connected so as to be free to move in the direction of its axis.

It will be noted that the shaft B in the form illustrated, extends through two hollow members, namely, the hub G and the driving axle T and that the two universal joints G¹ and G² are at the outer opposite ends of these hollow members. It is not essential to the carrying out of my invention that both of these universal joints be in the positions illustrated. With the joint G¹ in the position shown I do not wish to be limited to the placing of the joint G² at the extreme opposite end of the driving axle T, or with the joint G² in the position illustrated, I do not wish to be limited to the placing of the joint G¹ at the extreme opposite end of the hub.

Having thus described my invention what I claim is:

1. In electrically operated railway vehicles, the combination with driving wheels, a driving axle carried thereby, a spring supported vehicle frame and an electric motor mounted thereon, of means for transmitting power from said electric motor including a gear member carried by said frame and disposed substantially co-axial with said driving wheels outside of the latter, and means for transmitting power from said gear member to said driving axle, including a drive shaft extending freely through said gear member, a universal joint connecting said shaft and the outer side of said gear member, and a second universal joint connecting said shaft and said axle.

2. In electrically operated railway vehicles, the combination with driving wheels, a driving axle carried thereby, a spring supported vehicle frame and an electric motor mounted thereon, of means for transmitting power from said electric motor including a gear member carried by said frame and disposed substantially co-axial with said driving wheels, outside of the latter, and means for transmitting power from said gear member to said driving axle including a drive shaft extending freely through said gear member and centrally through said axle, a universal joint connecting said shaft and the outer side of said gear member, and a second universal joint connecting said shaft and said axle.

3. In electrically operated railway vehicles, the combination with driving wheels, a hollow driving axle carried thereby, a spring supported vehicle frame and an electric motor mounted thereon, of means for transmitting power from said electric motor including a gear member carried by said frame and disposed substantially co-axial with said driving wheels outside of the latter, and means for transmitting power from said gear member to said driving axle, including a drive shaft extending lengthwise through said axle, a universal joint connecting said gear member and said shaft, and a second universal joint connecting said shaft and said axle at the far end of the latter.

4. In electrically operated railway vehicles, the combination with driving wheels, a hollow driving axle carried thereby, a spring supported vehicle frame and an electric motor mounted thereon, of means for transmitting power from said electric motor including a gear member carried by said frame and disposed substantially co-axial with said driving wheels outside of the latter, and means for transmitting power from said gear member to said driving axle, including a drive shaft extending lengthwise through both said gear member and said axle, a universal joint connecting said shaft and the outer side of said gear member, and a second universal joint connecting said shaft and the opposite end of said axle.

5. In electrically operated railway vehicles, the combination with a spring supported vehicle frame, an electric motor mounted thereon, a driving axle and driving wheels carried thereby, of means rigidly connected with said vehicle frame and located outside of said driving wheels for transmitting power from said electric motor, said means including a driving gear wheel having an opening through the center thereof, a shaft extending through said hollow center, a universal joint connecting said gear wheel and said shaft, and a second universal joint connecting said shaft and said axle.

6. In combination, a driving axle, driving wheels carried thereby, a vehicle frame relatively movable in respect to said axle and including a bearing outside of said driving wheels, a gear member carried by said bearing, a shaft extending lengthwise through said bearing, and a pair of universal joints at opposite ends of said shaft, one connected to said gear member and the other to said axle.

7. In combination, a hollow driving axle, driving wheels carried thereby, a vehicle frame relatively movable in respect to said axle and including a bearing outside of said driving wheels, a gear member carried by said bearing, a shaft extending lengthwise through said axle, and a pair of universal joints at opposite ends of said shaft, one connected to said gear member and the other to said axle.

8. In a vehicle, the combination of an axle, a vehicle frame relatively movable in respect thereto, a gear wheel carried by said frame and disposed substantially co-axial with said axle, a power transmitting member, and a pair of universal joints, one connecting said member and said axle and the other connecting said member and said gear.

In testimony whereof, I affix my signature in the presence of two witnesses.

OTTO TSCHANZ.

Witnesses:
HANS RINDERKUECHT,
FRIEDRICH MONING.